United States Patent [19]

Yang

[11] Patent Number: 5,199,655
[45] Date of Patent: Apr. 6, 1993

[54] PISTOL-SHAPED PEPPER GRINDER

[76] Inventor: Hang-Te Yang, No. 20-1, Hsin Ho Heng Rd., An Ping Ind. Park, Tainan, Taiwan

[21] Appl. No.: 801,032

[22] Filed: Dec. 2, 1991

[51] Int. Cl.⁵ .............................................. A47J 42/34
[52] U.S. Cl. ................................. 241/169; 241/259.1
[58] Field of Search ...................... 241/168, 169, 259.1

[56] References Cited

U.S. PATENT DOCUMENTS 4,573,244 3/1986 Holcomb et al. .................. 241/169
4,697,749 10/1987 Holcomb et al. .................. 241/169

*Primary Examiner*—Douglas D. Watts

[57] ABSTRACT

A pistol-shaped pepper grinder having a grinding plate and a grinding block provided inside a pistol-shaped housing, the grinding plate able to be moved by a trigger to grind pepper stored in a chamber on the grinding plate and going through the space between the grinding plate and the grinding block, the grinding block being able to be moved down so as to adjust the minuteness of the ground papper, and ground pepper coming out of an exit provided in the right end of the housing.

4 Claims, 3 Drawing Sheets

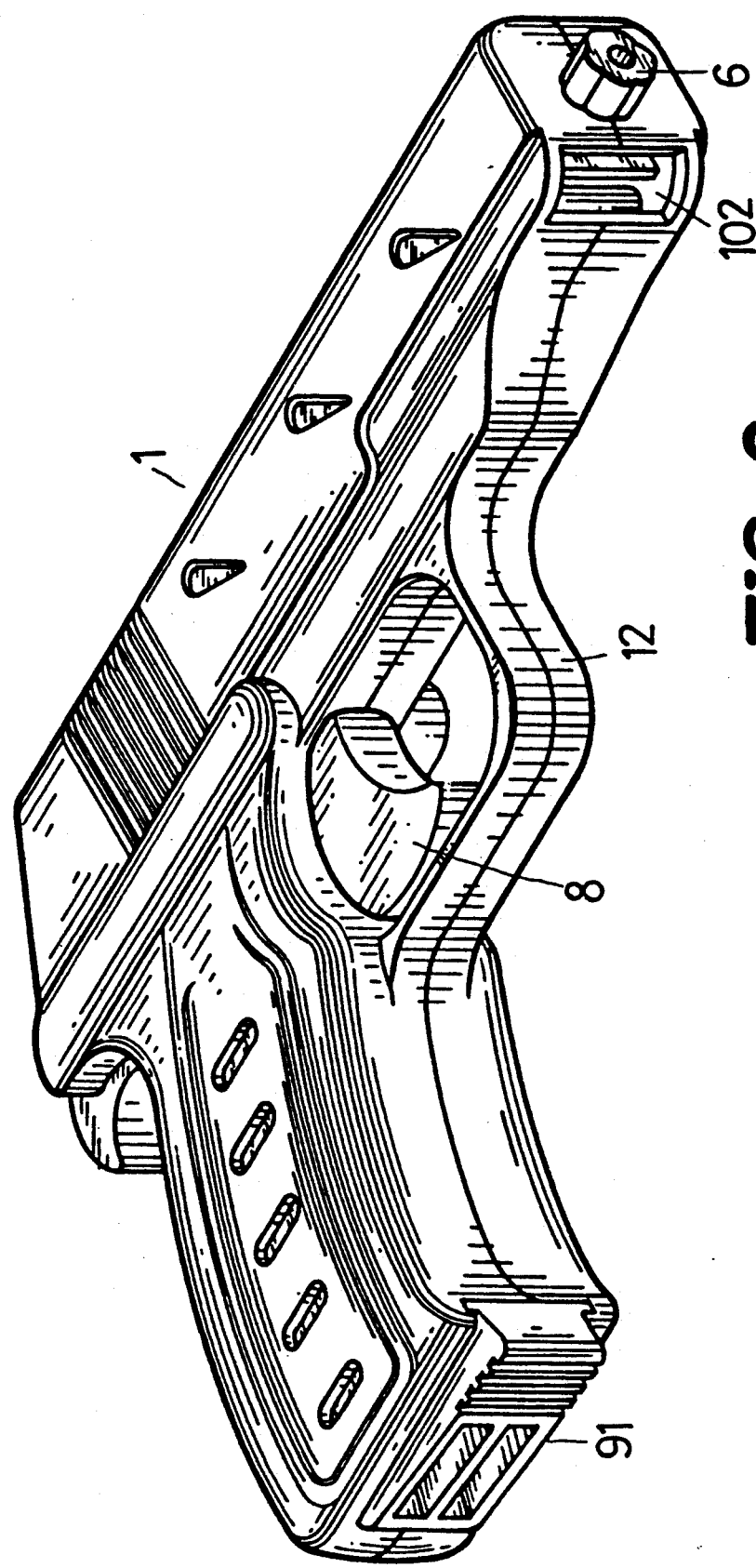

PISTOL-SHAPED PEPPER GRINDER

BACKGROUND OF THE INVENTION

Conventional pepper grinders generally lack outer interesting forms to attract the curiosity of users.

SUMMARY OF THE INVENTION

In order for a pepper grinder to make a fresh, interesting impression on a user, this invention has been devised to supply a pepper grinder formed as a pistol which has a trigger operated mechanism to grind the pepper.

The pistol-shaped pepper grinder of the present invention comprises a pistol-shaped housing consisting of two symmetrical halves, which defines a chamber for storing grain pepper, a grinding plate along the chamber and a grinding block provided above a front portion of the grinding plate to form a space between them for pepper to pass through to be ground. The ground pepper falls out of an exit in an end of the housing. The grinding plate, which has a grinding teeth portion, can be pushed forward by the trigger when the trigger is pulled back, to grind pepper positioned in the space between said plate and said block.

The grinding block can be moved down by an adjusting rod rotated by a turning button combined with said rod, narrowing the space between said block and the grinding plate so as to adjust the size of the ground pepper.

BRIEF DESCRIPTION OF THE DRAWINGS

FIG. 3 is a perspective view of the pistol-shaped pepper grinder of the present invention.

DETAILED DESCRIPTION OF THE INVENTION

Figure 1:
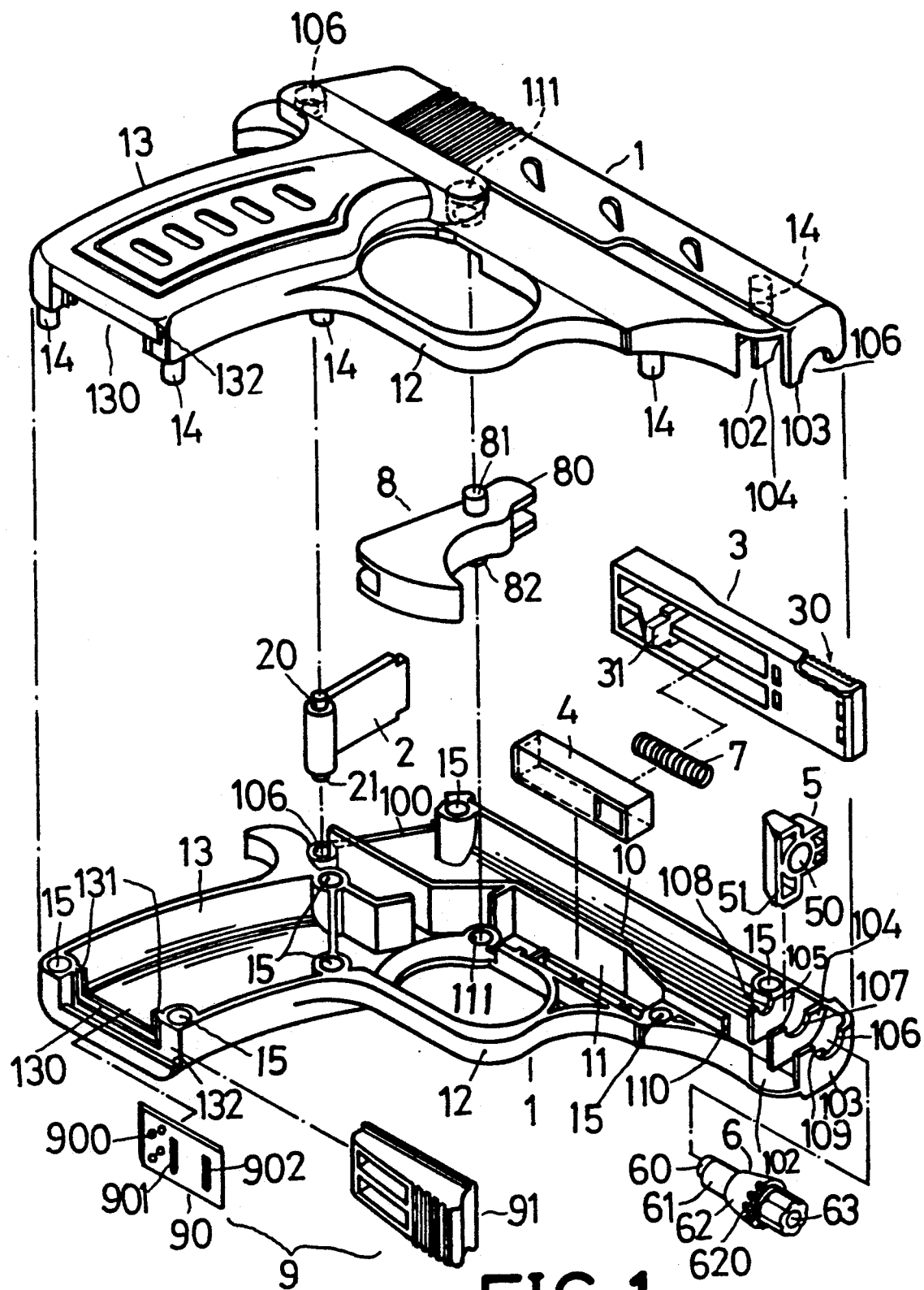
FIG. 1 is an exploded perspective view of the pistol-shaped pepper grinder of the present invention.

The pistol-shaped pepper grinder in the present invention, as shown in FIG. 1, comprises a pistol-shaped housing consisting of two symmetrical half housings 1 combined together, a cap 2, a grinding plate 3, a spring housing 4, a grinding block 5, an adjusting rod 6, a trigger 8, and a cap unit 9 as the main components.

Figure 2:
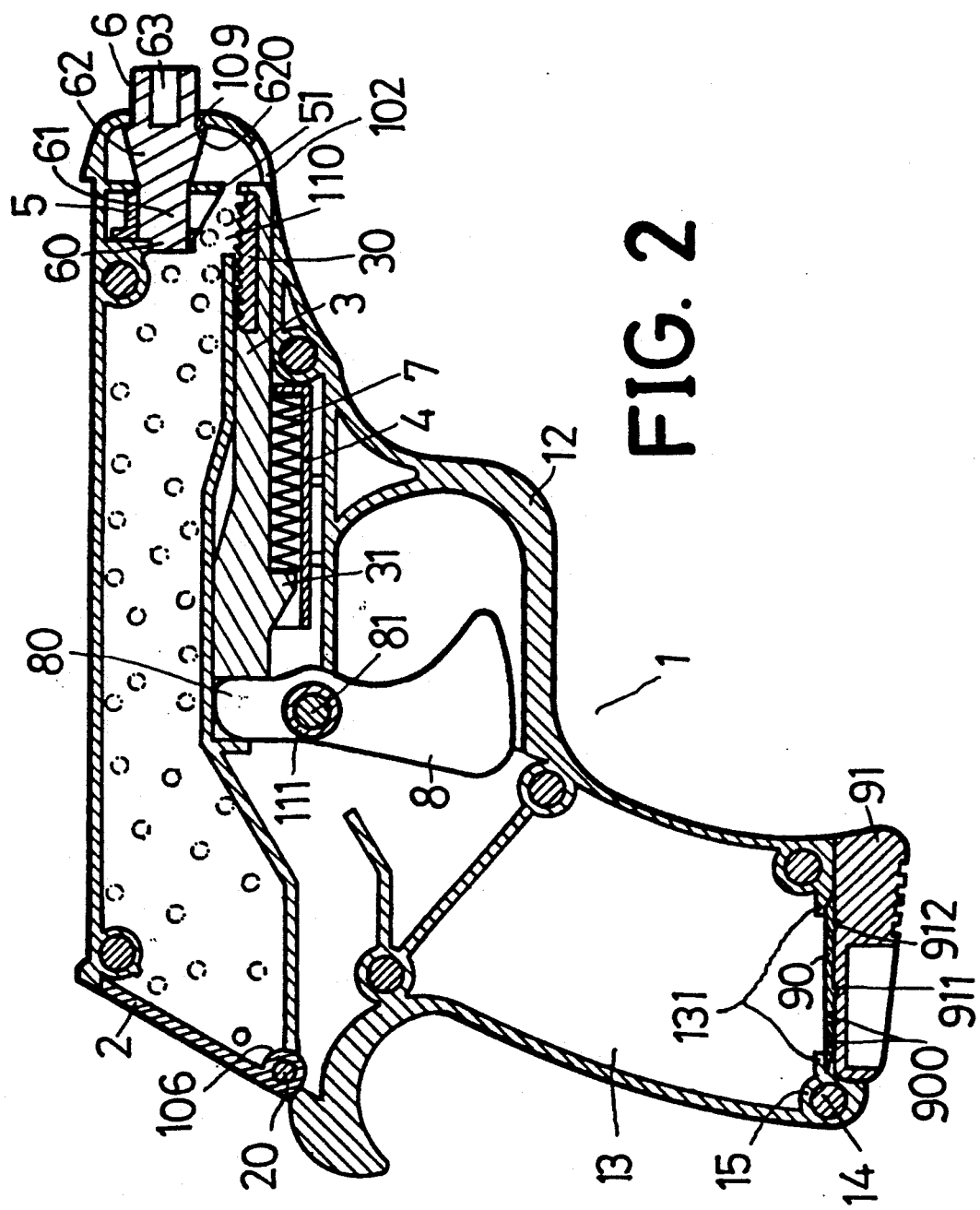
FIG. 2 is a side cross-sectional view of the pistol-shaped pepper grinder of the present invention.

The two symmetrical half housings 1 are separately provided with a barrel to form a chamber 10 for storing grain pepper in an upper portion, an entrance 100 in the rear end of the chamber 10, a shaft hole 106 in the left side (as seen in FIG. 1) of the entrance 100, an exit 102 in the right end, three separating plates 103, 104, 105 properly spaced apart in the right end (as seen in FIG. 1) three semi-circular grooves 116, 107, 108, in the edges of the three plates 103, 104, 105, a projection 109 on the semi-circular groove 116, a sliding cell 11 just below the chamber 10, a sliding cell opening 110, a shaft hole 111 at the left (as viewed in FIGS. 1 and 2) of the sliding cell 11, a trigger guard 12 below the sliding cell 11, a grip 13 defining a lower chamber 13 for storing a seasoning like salt, etc., an opening 130 in the bottom end of the grip, two vertical opposite guide rails 131 on both sides of the opening 130, and a horizontal sliding groove 132 in the upper and lower horizontal sides of the opening 130. The two half housings 1 are assembled together firmly by means of pins 14 and pin holes 15 provided at several corners and fitting with one another.

The cap 2 is provided to cover the entrance 100 of the chamber 10, having the same size of the entrance 100. The cap 2 also has two shaft pins 20, 21 projecting up and down from the left side to fit in two pin holes 106 in the left side of the entrance 100 so that the cap 2 can swing open with the shaft pins 20, 21 as pivots.

The grinding plate 3 is rectangular shaped to fit in the sliding cell 11, having grinding teeth 30 for grinding grain pepper on a right upper side (as viewed in FIG. 2) and a block 31 extending downwardly therefrom.

The spring housing 4 is fitted in the sliding cell 11 under the grinding plate 3 and a spring 7 is placed in the spring housing 4. The block 31 of the grinding plate 3 extends into the spring housing 4, contacting and pushing against the left end of the spring 7 which has its opposite end bearing against the wall of the spring housing 4.

The grinding block 5 is provided to fit in the space between the separating plates 104 and 105 and has a sloped grinding portion 51.

The adjusting rod 6 is provided to fit horizontally in the three semi-circular grooves 116, 107, 108 in the separating plates 103, 104, 105, and has a shaft portion 60 to fit in the semi-circular groove 108, a middle eccentric portion 61 to fit through the through hole 50 in the grinding block 5 and also to fit in the semi-circular groove 107, a right cone-shaped position portion 62 provided with a plurality of shallow holes 620 in an edge portion to correspondingly fit with the projection 109 on the semi-circular groove 106 and a turning button 63 extending from the cone-shaped position portion 62.

The trigger 8 is provided under the left end (as viewed in FIG. 2) of the sliding cell 11 and within the trigger guard 12, having a top pushing portion 80 to contact and push the end of the grinding plate 3, two shaft rods 81, 82 extending from both sides under the pushing portion 80 to fit in two shaft holes 111, enabling the trigger 8 to be pulled back by a finger to rotate with the shaft rods 81, 82 as pivots.

A cap unit 9 is provided to cover an opening 130 in the lower end of the lower chamber 13, consisting of an inner cap 90 and an outer cap 91. The inner cap 90 fits in guide rails 131 of the opening 130, having through holes 900 for a seasoning, such as salt, stored in the lower chamber 13 and two ridges 901, 902 to engage with two slots 911, 912 in the outer cap 91 so that the outer and the inner cap can be combined together firmly.

In assembling this grinder, at first the pins 20, 21 of the cap 2 are fitted in the pin holes 106 in both half housings 1, and the shafts 81, 82 of the trigger 8 are fitted in the shaft holes 111 in both half housings 1. Next, the spring 7 is placed in the spring housing 4, and the block 31 in the grinding plate 3 is inserted in the left portion of the spring housing 4, the spring 7 pinched between the black 31 and the vertical right wall of the spring housing 4. Then the grinding plate 3, together with the spring housing 4, is placed in the sliding cell 11, letting the grinding teeth 30 extending out of the sliding cell opening 110 and positioning the spring housing 4 under the sliding cell 11. After that, the adjusting rod 6 is inserted through the through hole 50 in the grinding block 5, and the adjusting rod 6 together with the grinding block 5 is placed in the three separating plates 103, 104, 105, with the grinding block 5 fitting between the inner and the middle plates 104, 105, with the shaft portion 60 of the adjusting rod 6 fitting in the semicircular groove 108 in the inner separating plate 105, with the cone-shaped position portion 62 fitting between the middle and the outer separating plate 104, 103, with the turning button 63 positioned outside of the outer separating plate 103, and with one of the shallow holes 620 of the position portion 62 fitting with the projection 109 on the semi-circular groove 116 in the outer separating plate 103. Then the upper and the lower half housings 1 are combined together, fitting pins 14 in the corresponding pin holes 15. And lastly, the cap unit 90 is placed on the opening 130 at the lower end of the lower chamber 13, by placing the inner cap 90 between the guide rails 131 and then sliding the outer cap 91 in the sliding grooves 132 from the right to the left (as viewed in FIG. 2) and covering the inner cap 90 and then fitting the ridges 901, 902 with the slots 911, 912 to combine both the inner and the outer caps 90, 91 together.

In using this grinder, the cap 2 has to be pulled to swing open before grain pepper is filled through the opening 100 into the chamber 10. Then the trigger 8 is pulled back, letting the pushing portion 80 push the grinding plate 3 rightward so that the grain pepper positioned in the space between the teeth 30 and the sloped grinding face 51 of the grinding block 5 can be ground. If the trigger 8 is released after having been pulled, the grinding plate 3 can be pushed back to its original position by the elasticity of the spring 7 in the spring housing 4 and then the trigger 8 is returned to its original position by the plate 3. Repeated pulling and releasing movement of the trigger can grind the grain pepper in the chamber 10 into powder pepper, which then falls out of an exit 102 in the lower end of the chamber 10.

If the size of ground powder pepper is to be adjusted, the turning button 63 is turned to rotate the adjusting rod 6, and the eccentric portion 61 can rotate to move the grinding block 5 down and thus the space between the sloped grinding face 51 and the teeth portion 30 of the grinding plate 3 can be made narrower to diminish the size of the ground powder pepper.

The adjusting rod 6 is kept stabilized by the fitting engagement of the projection 109 on the semi-circular groove 116 in the outer separating plate 103, said rod 6 cannot move during grinding action.

The lower chamber 13 can be used for storing a different kind of seasoning such as salt, etc., which can be shaken out thereof by pushing rightward the outer cap 91 to expose the holes 900 in the inner cap 90 and the contents can be shaken out of said holes 900.

What is claimed is:

1. A pepper grinder comprising:
   a) a pistol shaped housing having a barrel portion and a grip portion, the housing defining an interior grain pepper storage chamber, an entry opening for placing grain pepper into the storage chamber and a first exit opening through which ground pepper may pass;
   b) first closure means operatively associated with the pistol shaped housing for selectively opening and closing the entry opening;
   c) a grinding plate having a grinding teeth portion slidably mounted within the pistol shaped housing such that at least the grinding teeth portion extends into the grain pepper storage area;
   d) a grinding block operatively associated with the pistol shaped housing and the grinding plate such that sliding movement of the grinding plate grinds the grain pepper between the grinding plate and the grinding block;
   e) a trigger pivotally attached to the pistol shaped housing and operatively associated with the grinding plate such that pivoting movement of the trigger causes the grinding plate to slide relative to the pistol shaped housing;
   f) biasing means operatively associated with the grinding plate so as to bias the grinding plate to an extreme position;
   g) a seasoning storage chamber defined within the grip portion of the pistol shaped housing;
   h) a second exit opening defined by the pistol shaped housing in communication with the seasoning storage chamber; and
   i) second closure means operatively associated with the pistol shaped opening so as to selectively open and close the second exit opening.

2. The pepper grinder of claim 1 further comprising adjusting means operatively associated with the grinding block to adjust the position of the grinding block relative to the grinding teeth portion of the grinding plate so as to adjust the size of the ground pepper.

3. The pepper grinder of claim 2 wherein the adjusting means comprises:
   an adjusting rod rotatably attached to the pistol shaped housing and adapted to be manually rotated, the adjusting rod having an eccentric portion operatively associated with the grinding block such that rotation of the adjusting rod adjusts the position of the grinding block relative to the grinding teeth portion of the grinding plate.

4. The pepper grinder of claim 1 wherein the second closure means comprises:
   a) an inner cap affixed to the pistol shaped housing so as to cover the second exit opening, the inner cap defining a plurality of holes therethrough; and,
   b) an outer cap slidably attached to the pistol shaped housing so as to be movable between a closed position in which it covers the plurality of holes through the inner cap, and an open position in which the plurality of holes through the inner cap are exposed.

* * * * *